United States Patent [19]

Minami et al.

[11] Patent Number: 5,043,959
[45] Date of Patent: Aug. 27, 1991

[54] APPARATUS FOR DEVELOPING A MAGNETIC FIELD WHICH MAINTAINS A NEUTRAL POSITION WHEN THE MAGNETIC BIASING FIELD IS NOT APPLIED

[75] Inventors: Hisashi Minami, Kaizuka; Toshihisa Deguchi; Shozo Kobayashi, both of Nara; Yoshiki Nishioka, Tenri, all of Japan

[73] Assignee: Sharp Kabushiki Kaisha, Osaka, Japan

[21] Appl. No.: 191,062

[22] Filed: May 6, 1988

[30] Foreign Application Priority Data

May 8, 1987 [JP] Japan ................................ 62-113384

[51] Int. Cl.⁵ .......................... G11B 13/04; G11B 5/03
[52] U.S. Cl. ...................................... 369/13; 360/114; 360/66
[58] Field of Search ....................... 369/13; 360/59, 66, 360/114; 365/122

[56] References Cited

U.S. PATENT DOCUMENTS 4,748,606 5/1988 Naito et al. ........................ 360/114
4,789,972 12/1988 Oldham ............................. 360/114

FOREIGN PATENT DOCUMENTS 0222916 4/1986 European Pat. Off. .
3510620 3/1985 Fed. Rep. of Germany .
59-54003 3/1985 Japan ................................... 360/59

OTHER PUBLICATIONS

Japanese Patent Abstract, vol. 8, No. 282 (P-323) [1719], Dec. 22, 1984 (JP/59-146408).

Primary Examiner—Stuart S. Levy
Assistant Examiner—Hoa Nguyen

[57] ABSTRACT

An apparatus for operating a magneto-optic medium includes a magnetic biasing field developing device for developing a magnetic biasing field which is applied to the magneto-optic medium when the magneto-optic medium erases or records data. Additionally, a neutral-position controller is provided for positioning permanent magnets of the magnetic biasing field developing device in a neutral position with respect to the medium when the magnetic biasing field developing device is switched off. Thereby, the neutral-position controller maintains the medium at the neutral position with respect to the permanent magnets until the magnetic biasing developing device is switched on and the permanent magnets are placed in a field applying position.

9 Claims, 2 Drawing Sheets

APPARATUS FOR DEVELOPING A MAGNETIC FIELD WHICH MAINTAINS A NEUTRAL POSITION WHEN THE MAGNETIC BIASING FIELD IS NOT APPLIED

BACKGROUND OF THE INVENTION

The present invention relates to an apparatus for developing a magnetic field and, more particularly, to an apparatus which uses a permanent magnet for developing a magnetic biasing field in a magneto-optic disc system.

Conventionally, an apparatus for developing a magnetic biasing field to a memory medium by using a permanent magnet continues to produce a magnetic field on the memory medium for a long time even after the power source of a main body is switched off, because the permanent magnet is not fixed. Thereby, the permanent magnet continues to act on the memory medium.

However, in a magneto-optic disc system, when data is written or erased, a magnetic biasing field developed from outside is desired to be as low as possible except when the magnetic biasing field is necessary for actually writing or erasing data.

For example, if a magneto-optic disc is exposed to a high magnetic field for a great deal of time, there is the possibility that the signals recorded on the medium of the disc will deteriorated. This result is not desirable since of the magneto-optic disc will be reduced.

SUMMARY OF THE INVENTION

Accordingly, it is an object of the present invention to provide an apparatus for developing a magnetic biasing field which automatically returns to the neutral position when the power source for the apparatus is switched off and which keeps the neutral position until the power source for the apparatus is switched on again.

Briefly described, in accordance with the present invention, an apparatus for giving a magnetic biasing field comprises neutral position keep means for making the magnetic field automatically return to the neutral position in relation to the memory medium and for keeping the magnetic field at the neutral position until the power source for the apparatus is switched on again.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
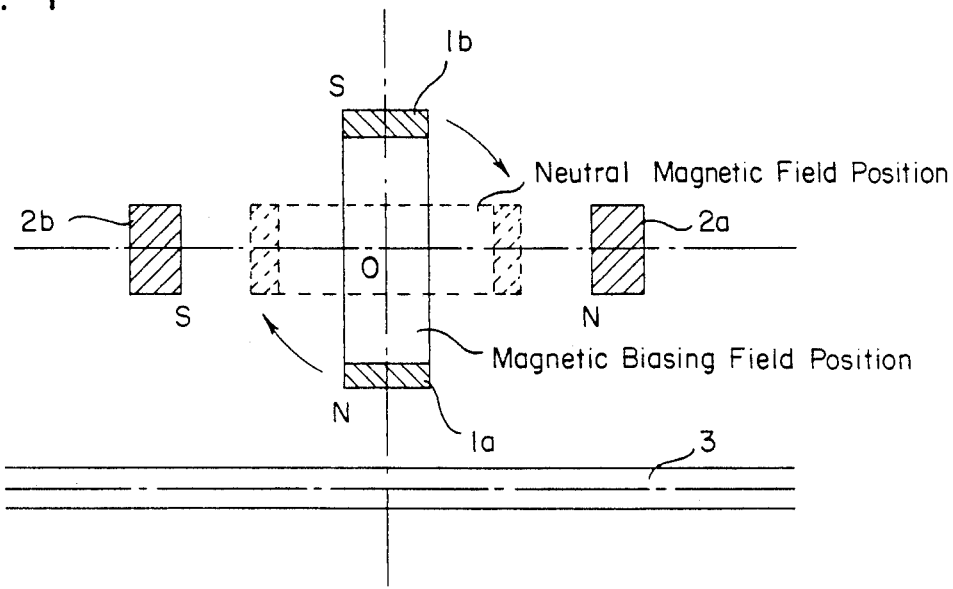
FIG. 1 is schematic diagramatic view illustrating an apparatus for developing a magnetic biasing field as an embodiment of the present invention.
Figure 2:
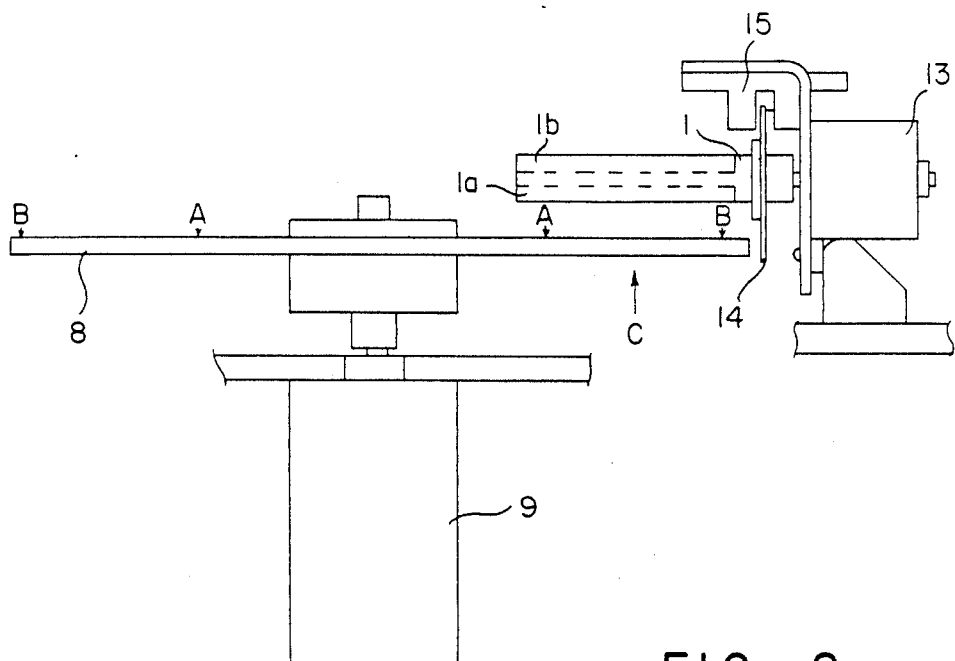
FIG. 2 is a schematic view illustrating essential portions of a magneto-optic disc system.
Figure 3:
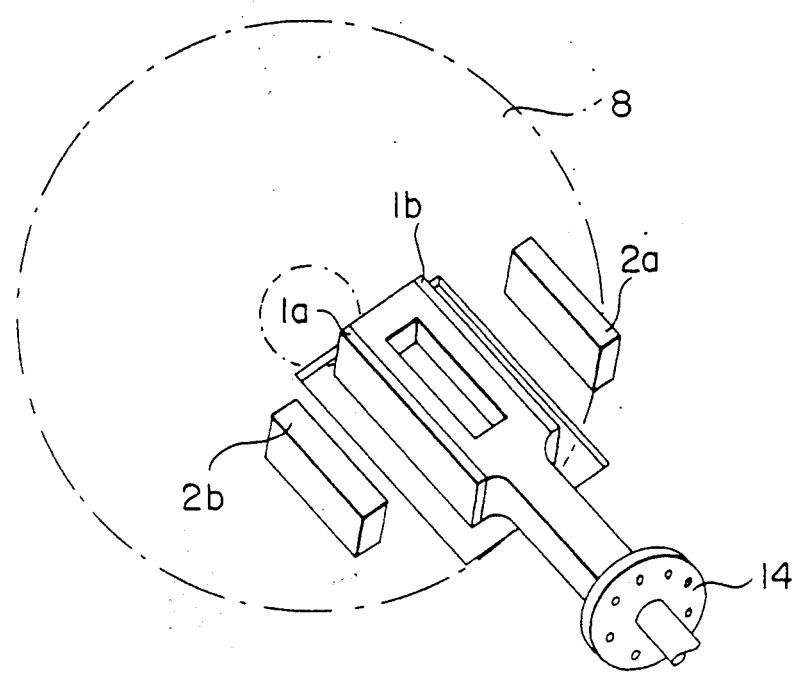
FIG. 3 is a perspective view illustrating the embodiment of the present invention in FIGS. 1 and 2.
Figure 4:
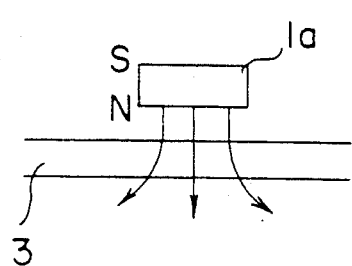
FIG. 4 illustrates the position of the magnets for writing, reading-out and similar functions with respect to the recording medium for the embodiment of the present inventions in FIGS. 1-3.
Figure 5:
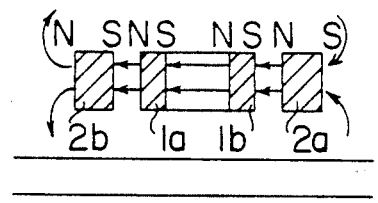
FIG. 5 illustrates the position of the magnet in the neutral position with respect to the recording medium for the present embodiment.

FIG. 2 is a schematic view illustrating essential portions of a magneto-optic disc system. A memory medium (magneto-optic disc) 8 includes a substrate of glass or plastic, and a magnetic thin film made of rate earth metal and transition metal, for example, GbTbFe and TbDyFe. The magnetic thin film is disposed on the portion between points A and B in FIG. 2 (the length of the portion between points A and B is called an effective radius). The memory medium 8 is rotatably driven by a motor 9. Permanent magnets 1a and 1b have reversed polarity with respect to each other. One of the permanent magnets is provided on the front side of a holder 1 while the other magnet is provided on the rear side of the holder 1. A stepping motor 13 rotates the holder 1 and the position of the magnets 1a and 1b can be reversed. A disc 14 is fixed to the holder 1, and a hole is formed on a suitable portion of the disc. A position sensor 15 with a built-in photo coupler detects the hole of the disc 14 when the disc 14 is rotated. By the detection of the hole, the position sensor 15 recognizes the positions of the magnets 1a and 1b. The magnets 1a and 1b are rodshaped and the length of the magnets are longer than the effective radius of the magnetic thin film of the magneto-optic disc 8. Accordingly, it is not necessary to link the magnets 1a and 1b to the movement of an optical head (not shown) along with the radius of the magneto-optic disc. Thereby the mechanism is made to be simple for developing a magnetic field from outside. In FIG. 2, C shows the direction of the laser which the optical head irradiates. Permanent magnets 2a and 2a which are of the main feature of the present invention are provided on a chasis 10 in front of and at the rear of the holder 1 in FIG. 2 (though the permanent magnets 2a and 2b are not actually illustrated in FIG. 2). FIG. 1 illustrates a schematic view of an apparatus for developing a magnetic biasing field, wherein like reference characters designate like elements as in FIG. 2. The magnetic biasing field position is illustrated by solid lines for the position when writing, reading-out, and similar functions are to be carried out on the memory medium 3.

The neutral magnetic field position is illustrated by broken lines for the neutral position of the memory medium when the power source of the apparatus for developing a magnetic biasing field is switched off. When the power source is switched off, the motor 13 positions the magnets 1a and 1b in a neutral position by a conventional manner. The magnets 2a and 2b are fixed so that they can attract the magnets 1a and 1b in order to keep this neutral position. The magnets 2a and 2b ensure that the magnets 1a and 1b are kept in the neutral position until the power source of the apparatus is switched on.

In the magnetic biasing field position (when a magnetic biasing field is developed), if the power source is switched off, the above-mentioned magnets 2a and 2b are attracted to the magnetic 1a and 1b and torque is produced in the direction of the arrow 4 around the point 0 which automatically returns the apparatus to the neutral magnetic field position.

Further, even if external power, such as oscillation or impact acts upon the apparatus when the power source is switched off, the apparatus is maintained at the above neutral position.

As is clearly described above, an apparatus for developing a magnetic biasing field according to an embodiment of the present invention utilizes the attracting power of permanent magnets without losing any substantial amounts of energy. Thereby, the safety of the information written on a magneto-optic disc is ensured by automatically returning the apparatus to the neutral position when the power source is switched off and by keeping the apparatus at the neutral position until the power source is switched on again.

While only certain embodiments of the present invention have been described, it will be apparent to those skilled in the art that various changes and modifications may be made therein without departing from the spirit and scope of the present invention as claimed.

What is claimed is:

1. An apparatus for controlling applications or magnetic biasing fields to a magneto-optic medium, comprising:
   magnetic biasing field developing means for developing the magnetic biasing fields and applying the magnetic biasing fields to said magneto-optic medium when data is desired to be erased or recorded on said medium in a field applying condition and failing to develop and apply the magnetic biasing fields to said magneto-optic medium in a neutral condition; and
   neutral-position control means for positioning said magnetic biasing field developing means in a neutral-magnetic position with respect to said magneto-optic medium when said magnetic biasing field developing means is placed in said neutral condition and for maintaining said magnetic biasing field developing means at said neutral-magnetic position with respect to said magneto-optic medium until said magnetic biasing field developing means is placed in said field applying condition and said magnetic biasing field developing means is placed in a field applying position.

2. The apparatus of claim 1, wherein said neutral-position control means comprises a first pair of permanent magnets.

3. The apparatus of claim 2, wherein said magnetic biasing field developing means comprises a second pair of permanent magnets having reversed polarities.

4. The apparatus of claim 1, wherein the magneto-optic medium comprises a substrate and a magnetic thin film disposed on said substrate.

5. The apparatus of claim 4, wherein said substrate comprises glass or plastic.

6. The apparatus of claim 4, wherein said magnetic thin film comprises rare earth metal and transition metal.

7. The apparatus of claim 4, wherein said magnetic thin film comprises GdTbFe and TbDyFe.

8. An apparatus for controlling applications of magnetic biasing fields to a magneto-optic medium, comprising:
   driving means for rotatably driving the magneto-optic medium;
   a holder positioned above a top surface plane of the magneto-optic medium, including,
      a first permanent magnet disposed on a front portion of said holder having a first polarity, and
      a second permanent magnet disposed on a rear portion of said holder having a second polarity opposite to said first polarity;
   a motor for rotating said holder to reverse said first and second permanent magnets between a neutral position and a field applying position; and
   third and fourth permanent magnets fixedly mounted parallel to said top surface plane of the magneto-optic medium for maintaining said first and second permanent magnets in said neutral position, said third and fourth permanent magnets being positioned on opposite sides of said holder;
   wherein said first and second permanent magnets are positioned parallel to the magneto-optic medium in said field applying position for developing the magnetic biasing fields to the magneto-optic medium, and said first and second permanent magnets are attracted by said third and fourth permanent magnets to be positioned perpendicular to the magneto-optic medium is said neutral position so that the magnetic biasing fields fail to be developed on the magneto-optic medium.

9. A method for controlling applications of magnetic biasing fields to a magneto-optic medium, comprising the steps of:
   developing and applying the magnetic biasing fields to the magneto-optic medium by magnetic biasing field developing means when data is desired to be erased or recorded on the magneto-optic medium in a field applying condition and preventing the magnetic biasing fields from being developed and applied to the magneto-optic when said magnetic biasing field developed means is in a neutral condition;
   positioning said magnetic biasing field developing means in a neutral-magnetic position with respect to the magneto-optic medium when said magnetic biasing field developing means is placed in said neutral condition; and
   maintaining said magnetic biasing field developing means at said neutral-magnetic position with respect to the magneto-optic medium until said magnetic biasing field developing means is placed in said field applying condition and said magnetic biasing field developing means is placed in a field applying position.

* * * * *